United States Patent
Possell

[15] 3,695,112
[45] Oct. 3, 1972

[54] ELECTRICALLY OPERATED TEMPERATURE SENSING ASSEMBLY

[72] Inventor: Clarence R. Possell, 4842 Viane Way, San Diego, Calif. 92110

[22] Filed: Oct. 14, 1970

[21] Appl. No.: 80,537

[52] U.S. Cl.................73/362 AR, 324/61 R, 338/28
[51] Int. Cl.............................G01k 7/20, H01l 3/00
[58] Field of Search ......73/362 AR; 323/75 N, 75 H; 324/61 R

[56] References Cited

UNITED STATES PATENTS 3,379,973   4/1968   Walton..............73/362 AR X
3,429,178   2/1969   Durbin................323/75 N X

*Primary Examiner*—Louis R. Prince
*Assistant Examiner*—Frederick Shoon
*Attorney*—William C. Babcock

[57] ABSTRACT

A temperature sensing assembly that indicates the temperature of an electrical resistance element containing sensor by comparing the differential in voltages between that in a first feedback loop and the voltage in a second feedback loop of which said sensor forms a part.

The operating components of the assembly are: the temperature sensor; an electric power supply; a voltmeter; and an electric circuit that includes first and second operational amplifiers that have said first and second loops associated therewith and means in said circuit for supplying a constant current input to said amplifiers.

The sensor may be any resistance element that has a variable linear resistance value over a substantial temperature range. However, the assembly is considered to operate with optimum results, when the sensor described in the specification is used therewith.

5 Claims, 6 Drawing Figures

PATENTED OCT 3 1972 3,695,112
SHEET 1 OF 2
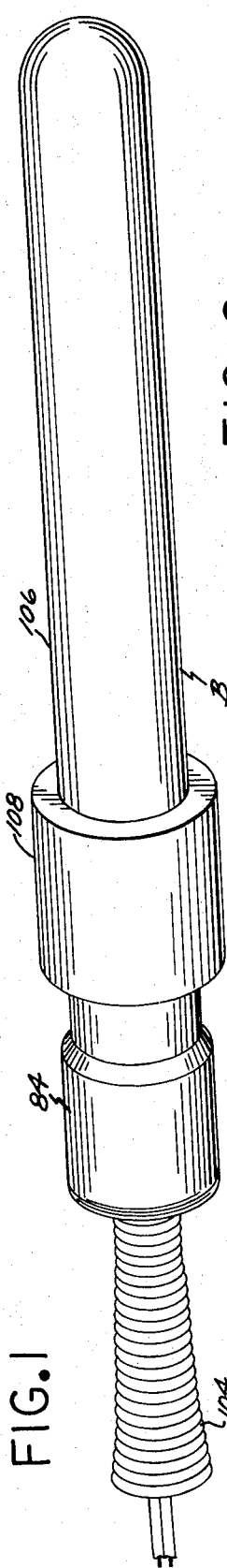
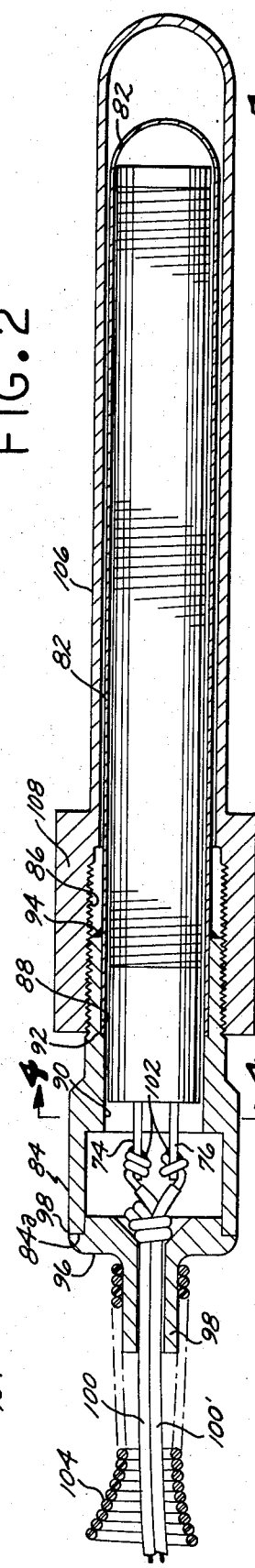
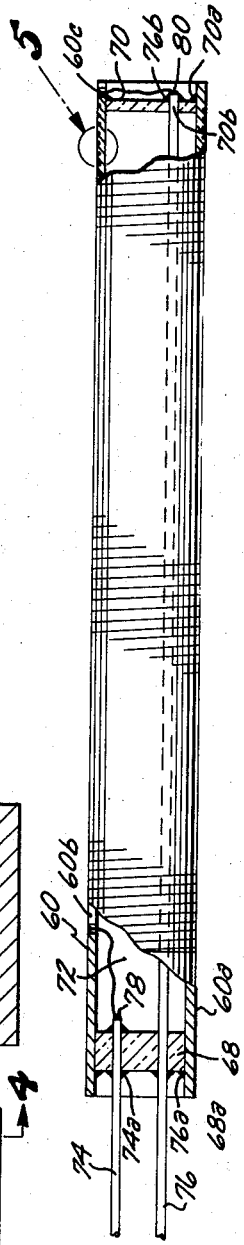
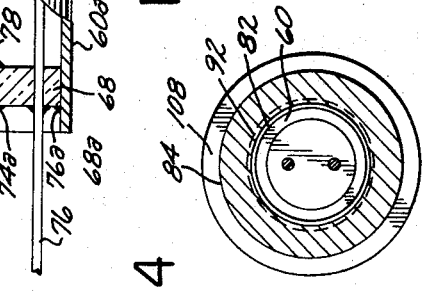
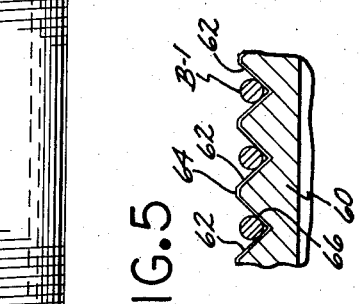
INVENTOR.
CLARENCE R. POSSELL
BY
William G. Babcock
ATTORNEY

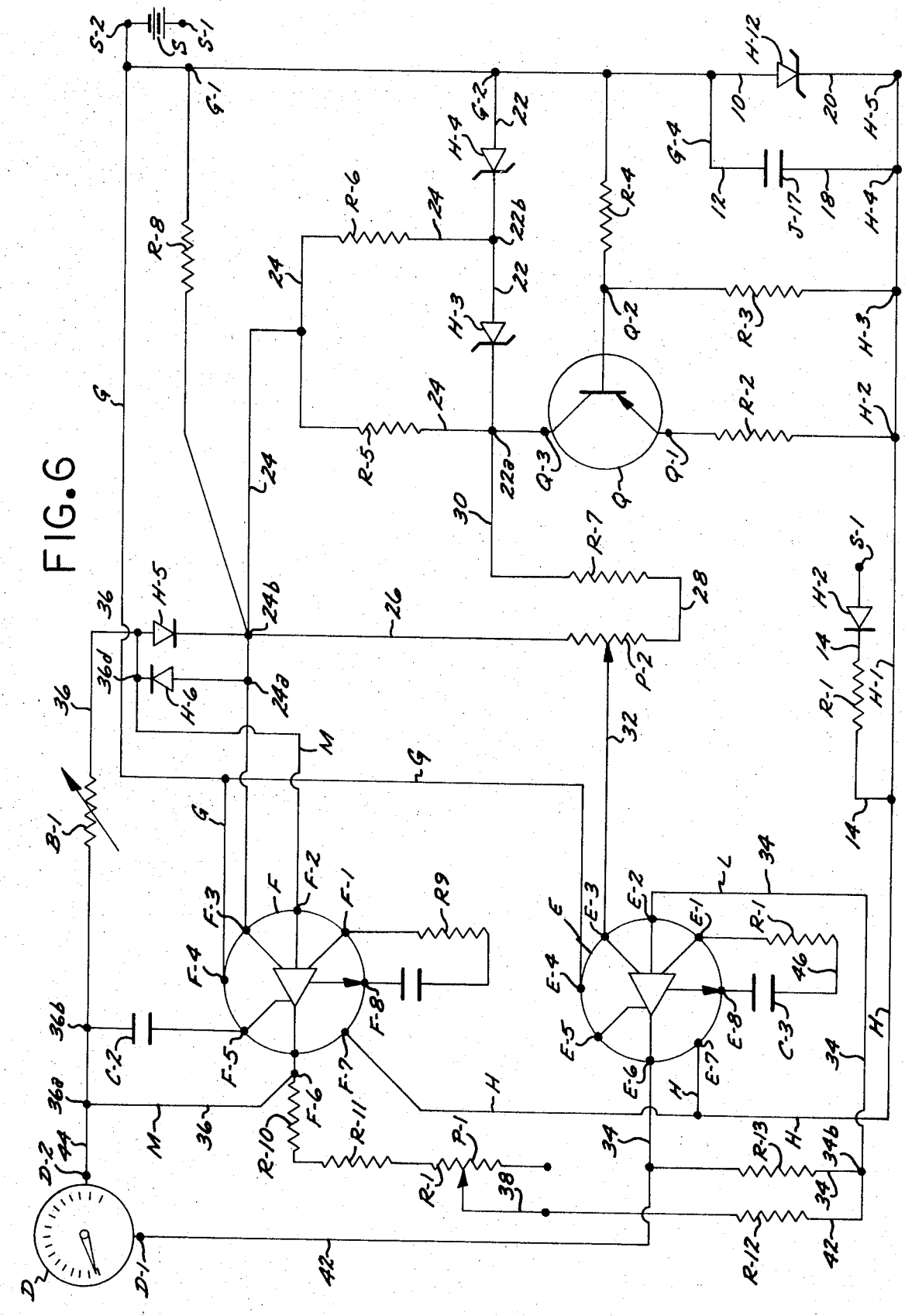

3,695,112

ELECTRICALLY OPERATED TEMPERATURE SENSING ASSEMBLY

BACKGROUND OF THE INVENTION

1. Field of the Invention

An electrically operated temperature sensing assembly.

2. Description of the Prior Art

Although electrical resistance element containing sensors have been used extensively in the past with electrical systems to determine temperature, such sensors have been usable only with specific systems that were compatible therewith. The temperature sensing assembly that comprises the present invention overcomes the operational disadvantages of prior art devices of this nature by being usable with a wide range of sensing probe structures, as well as being of substantially smaller size than previously available prior art devices of this nature, and having greater accuracy and flexibility thereover.

SUMMARY OF THE INVENTION

The temperature sensing assembly includes a reference voltage supply section, together with a measuring operational amplifier, the output of which measuring amplifier is controlled by the electrical resistance of the sensor, and a reference amplifier, which has a constant self-regulating output. A first feedback loop is in communication with the constant output of the first operational amplifier, and a second loop is likewise in communication with the output of the second operational amplifier.

The second loop contains the resistance element that forms a part of the sensor. The voltmeter is connected to both the first and second loops and indicates the difference in voltages existing therebetween, which differential in voltage is a function of the temperature to which the resistance element in the sensor is exposed. The assembly may be calibrated for sensors of different electrical resistances by varying the setting of the potentiometer and resistors that are shunt connected to the outputs of the first reference operational amplifier and the second measuring operational amplifier. The sensitivity of the system is in no way affected by these adjustments.

The use of the operational amplifiers in the temperature sensing assembly reduces metering output fluctuations to a minimum value, as the feedback control of the outputs of the two operational amplifiers provides an extremely stable output signal. This signal is affected by voltage variations in the feedback loop only of the second measuring amplifier and not by current or load variations. By varying the values of specific components in the electrical assembly such as that of certain resistors, as well as adjusting potentiometers that form a part of the system, the system may be used successfully with various sensing and metering components that are commercially available. In operation, the assembly is extremely stable and is not affected by variations in external power supplies or being subjected to substantially higher power loads than for which the assembly was designed.

A major object of the present invention is to provide an electrically operated temperature sensing assembly that may be used with a wide range of sensing probes and metering equipment presently available on the commercial market, and an assembly that is particularly adapted for use with the resistance element containing sensor shown and described in the present application.

Another object of the invention is to supply a temperature sensing assembly that is compact, light in weight, accurate in operation, and flexible in use.

Yet another object of the invention is to supply a temperature sensing assembly that may be easily and quickly recalibrated for use with sensors having different resistance variances, and an assembly, the accuracy of which is not disturbed by wide variations in the magnitude of the electric power supply or other circuit variations.

A still further object of the invention is to supply a temperature sensing assembly that employs solid-state components and one that may be subjected to substantial variations in temperature and power overload, without damage as well as being highly resistant to shock and vibration. Another object of the invention is to supply a temperature sensing assembly in which the temperature is indicated by the differential in voltages in a reference feedback loop and in a measuring loop and is hence free from error that may arise from variations in the power supply.

Another object of the invention is to supply an electrical resistance element containing temperature sensor through which heat is evenly and quickly distributed, that has a quick response to variations in temperature conditions, and one that more accurately reflects the temperature to which it is subjected than sensors of this type that have been previously available.

BRIEF DESCRIPTION OF THE DRAWING

FIG. 1 is a perspective view of the resistance element containing sensor;

FIG. 2 is a longitudinal cross sectional view of the device shown in FIG. 1;

FIG. 3 is a combined side elevational and longitudinal cross sectional view of the resistance wire supporting portion of the sensor;

FIG. 4 is a transverse cross sectional view of the device taken on line 4—4 of FIG. 2;

FIG. 5 is an enlarged longitudinal cross sectional portion of the resistance wire support taken within the confines of the circle shown in phantom line in FIG. 3, which circle is identified by the numeral 5; and FIG. 6 is a diagrammatic view of the electrical circuit used with the temperature sensing assembly.

DESCRIPTION OF THE PREFERRED EMBODIMENT presently

The temperature indicating assembly A includes a temperature sensing probe B, an electric circuit C, a temperature indicating unit D, and means S for connecting the assembly to a source of direct electric power. Sensing probe B includes a temperature sensitive variable linear resistance assembly B-1 of the structure hereinafter described if optimum results are to be attained by use of the assembly A, although resistance bulbs and thermistors of the type presently available through commercial channels may be employed if desired.

Temperature indicating unit D is a voltmeter that may be calibrated to indicate temperature from a direct reading therefrom, or a chart may be prepared that indicates the temperature of the sensing probe B as a function of the voltage readings obtained from the unit D.

The electrical circuit C includes a reference operational amplifier E having terminals E-1 to E-8 inclusive and a measuring operational amplifier F that likewise has terminals F-1 to F-8. The reference amplifier E emits a steady state electric feedback signal that is taken as the zero point of the voltmeter D. The feedback signal from reference amplifier E does not vary as it is controlled by a fixed feedback load resistance element R-9 as shown in FIG. 6. The feedback from the measuring amplifier F is controlled by the resistance of the sensing probe B, which resistance varies linearly with the temperatures to which the probe is exposed. As the resistance of the sensor probe B varies with temperature, the feedback from operational amplifier F varies, and the output from the amplifier F changes as a result thereof. The output from operational amplifier F may be either greater or less than that of the reference amplifier E, and the voltmeter D may be calibrated for any zero point desired.

The assembly A as may be seen in FIG. 6 includes potentiometers P-1 and P-2, and resistance elements R-1 to R-14 inclusive. The assembly A may be adjusted for sensors B of different resistances by varying the setting of potentiometer P-2 and using resistances R-5 and R-6 of the necessary value to provide the desired output for the specific sensor B being used at the desired reference temperature. The sensitivity of the assembly A is in no way affected by these adjustments.

The use of the operational amplifiers E and F reduces metering output fluctuations to a minimum as the feedback control of the outputs of these amplifiers results in an output signal that varies due to changed in resistance of the probe B only and not to current or load variations.

The detailed description of the assembly A is as follows. Terminal S-2 as may be seen in FIG. 6 is connected to the negative side of a source of direct power S and terminal S-1 to the negative side thereof. A conductor G is provided that extends from terminal S-2 to terminals E-4 and F-4. The conductor G has junction points G-1 to G-4 inclusive therein as shown in FIG. 6. Junction point G-4 is connected by a conductor 10 to one side of a Zener diode H-1 and by a conductor 12 to capacitor J-1.

Terminals E-7 and F-7 are connected to an electrical conductor H that has junction points H-1 to H-5 inclusive therein. An electrical conductor 14 that is connected to a resistor R-1 and Zener diode H-2 in series extends to positive terminal S-1 from junction point H-1. Junction points H-4 and H-5 are connected to capacitor J-1 and Zener diode H-1 by conductors 18 and 20 respectively. A transistor Q is provided, 2N1132, that has terminals Q-1, Q-2 and Q-3 connected to the emitter, base and collector thereof respectively. Terminals Q-1 and Q-2 are connected to resistors R-2 and R-3, which resistors are also connected to junction points H-2 and H-3 respectively.

Terminal Q-2 has a resistance element R-4 extending therefrom to junction point G-3. A conductor 22 is connected to junction point G-2 and has two Zener diodes H-3 and H-4 in series therein. Junction points 22a and 22b are provided in conductor 22 on the left hand sides of diodes H-3 and H-4 as may be seen in FIG. 6. Junction points 22a and 22b are connected to two resistors R-5 and R-6, which resistors are in parallel.

The resistance elements R-5 and R-6 are also connected to a conductor 24 that extends to terminal F-3. Conductor 24 has two junction points 24a and 24b therein.

Junction point 24b has a conductor 26 extending therefrom to potentiometer P-2, which potentiometer is connected to a conductor 28 that leads to a resistance element R-7. A conductor 30 extends from resistance element R-7 to terminal Q-3 of transistor Q.

Resistance elements R-1 and diode H-2 in the portion of circuit C above described serve to remove negative voltage spikes from the power supply S. Capacitor J-1 and diode H-2 cooperate to remove positive voltage spikes from the power supply in the circuit C. A resistance element R-8 is connected to junction points G-1 and 24b.

The transistor Q, Zener diodes H-3, H-4, resistance elements R-2, R-3, R-4, R-5, R-6, R-7, R-8 and potentiometer P-2 provide a constant reference electrical input to the operational amplifiers E and F through conductors 32 and 24 that are connected to terminals E-3 and F-3 respectively.

Reference operational amplifier E has a feedback loop associated therewith that includes a conductor 34 that extends from terminal E-6 to terminal E-2, with the conductor including a resistance element R-13. Conductor 34 includes two junction points 34a and 34b.

Measuring operational amplifier F has a feedback loop associated therewith that includes a conductor 36 that extends from terminal F-6 to terminal F-2 and is connected to resistance element B-1 of probe B. Resistance elements R-10, R-11 and potentiometer P-1 are connected in series to terminal F-6 of measuring operational amplifier F. A slide element 38 of potentiometer P-1 is connected by a conductor 40 to resistance element R-12, which element has a conductor 42 extending therefrom to junction point 34b.

Voltmeter D has one terminal D-1 connected by a conductor 42 to junction point 34a and the other terminal D-2 to junction point 36a by a conductor 44. Terminal F-5 and junction point 36b of feedback loop conductor 36 are connected to a capacitor C-2. Two oppositely oriented Zener diodes H-5 and H-6 are connected to junction points 36a, 24b, 36d, and 24a respectively. A capacitor C-3 and resistance element R-14 are connected in series to terminals E-8 and E-1 by a conductor 46. Terminals F-8 and F-1 have a capacitor C-4 and resistance element R-9 connected thereto in series by a conductor 48.

The diodes H-5 and H-6 result in inverted and noninverted inputs to operational amplifiers E and F respectively. Capacitor C-3 and resistance element R-7 prevent the response rate of reference operational amplifier E from changing or drifting. The capacitor C-4 and resistance element R-9 likewise prevent the response rate of measuring operational amplifier F from changing or drifting.

The assembly A as above described and shown in the drawings operates by comparing voltage variation in the feedback loop M of measuring operational amplifier F with the constant voltage in the feedback loop L of reference amplifier E. Electric power is supplied to the amplifiers from the source S through conductors H and G as shown in FIG. 6.

Transistor Q maintains a constant current input to the operational amplifiers E and F. The Zener diodes H-3, H-4 and resistances R-5, R-6 act as a voltage divider and voltage regulator to maintain a predetermined voltage input to the operational amplifiers E and F. Potentiometer P-2 may be adjusted to provide a desired voltage input to reference operational amplifier E.

In operation, the reference amplifier E provides a steady-state signal which is taken as the zero point on the meter D. This signal does not vary as it is controlled by the resistance R-13 which is the reference feedback load. Very little coupling exists either through the meter D or through the shunt resistors R-10, R-11, potentiometer P-1, and resistor R-12. Potentiometer P-1 serves as a fine adjustment means for calibration of meter D.

The feedback of the measuring amplifier is controlled by the resistance of the element B-1 in sensor B. As the resistance of element B-1 varies with temperature, the feedback likewise varies, varying the output of the operational amplifier F. As this output may be either greater than or less than that of the reference amplifier E, the system can be calibrated for any zero point desired. The meter D is connected by conductors 42 and 44 to junction point 34a that forms a part of the feedback loop L of reference amplifier E and junction point 36a that is a part of feedback loop M of measuring amplifier F. The meter D when so connected can detect a difference in the magnitude of the voltages in loops L and M, which difference is a function of the temperature to which resistance element is subjected.

The temperature sensor B as may be seen in FIG. 1-5 inclusive includes a tubular winding element 60 that is preferably formed from aluminum. Element 60 includes an end portion 60a that has a smooth external cylindrical surface. Longitudinally spaced grooves 62 of V-shaped transverse cross section as shown in FIG. 5 are formed on the balance of the external surface of element 60 in a helix-shaped configuration. The grooves 62 are separated by a helix-shaped section 64 of the external surface of element 60.

After the grooves 62 have been formed in winding element 60, the winding element is subjected to a hard anodizing operation. The layer of hard anodized aluminum 66 formed on the winding element 60 is an electrical insulator, but due to the thinness of the layer, the layer has little effect on the flow of heat either radially or longitudinally in the material defining the winding element 60.

First and second circular ceramic insulators 68 and 70 are bonded to the interior end portions of winding element 60 and are longitudinally aligned in the bore 72 that extends the length of the element. Beads of epoxy cement 68a and 70a are preferably used to hold the insulators 68 and 70 at fixed positions relative to the winding element 60.

First and second electrical conducting metallic rods 74 and 76 extend through transversely separated, longitudinally extending bores formed in the first ceramic insulators 68 as shown in FIG. 3, and are held therein by beads of epoxy cement 74a and 76a respectively. The first rod 74 terminates a short distance from the right hand side of the first insulator 68 as may be seen in FIG. 3. The second rod 76 extends to the right in the winding element 60 as shown in FIG. 3 to pass through a bore 70b formed in the second ceramic insulator 70 and terminate slightly to the right thereof. The second rod 76 is secured to insulator 70 by beads of epoxy cement 76b. The resistance element B-1 is preferably a fine platinum wire that is spiral wound under no tension to be cradled in the V-shaped grooves 62 as shown in FIG. 5, with a first end portion of the wire extending inwardly through an opening 60b formed in the left hand end portion of the winding element 60 to be connected by a silver solder bead 78 to one end of rod 74. The wire defining the resistance element B-1 has an end portion thereof extending inwardly through an opening 60c formed in the right hand end portion of the winding element 60 as viewed in FIG. 3 to be connected by a bead of silver solder 80 to a free end of the rod 76.

An elongate cup 82 is provided as may best be seen in FIG. 3 that is preferably formed of nickel, and is of such configuration that when the cup is heated to a substantial degree, the cup expands radially to the extent that the winding element 60 with the resistance element B-1 thereon can be inserted within the confines of the cup as shown in FIG. 2. The cup 82 serves as a protective shield for the winding element 60 and the resistance element B-1 found thereon. As the cup 82 cools, it contracts radially, and grips the external surface of the winding element 60 with sufficient force that a good metal-to-metal bond is secured between the two.

A coupling 84 is provided as shown in FIG. 2 that has an external threaded surface 86 on the right hand end thereof as shown in FIG. 2. A bore 88 and counterbore 90 extend longitudinally through the coupling 84, with the bore and counterbore cooperating to define a circumferentially extending seat 92 at the junction thereof. The bore 88 is of such transverse cross section as to snugly and slidably engage the right hand end portion of the protective cup 82, with the free end of the cup being in abutting contact with the seat 92. Beads of silver solder 94 serve to hold the cup 82 and winding element 60 in a fixed relationship with the coupling 84 as shown in FIG. 2. Coupling 84 has an open end 84a. The open end 84a is closed by a cover 96 that is secured to the coupling 84 by a silver solder bead 98 as shown in FIG. 2. The cover 96 includes a tubular neck 98 through which two insulated electrical conductors 100 and 100' extend. The conductors 100 and 100' have bared end portions thereof connected to the rods 74 and 76 by beads of high temperature silver solder 102.

The conductors 100 and 100' are situated within the confines of a resilient bottle spring 104 that is secured to neck 98 by conventional means, with the bottle spring preventing abrupt bending of the conductors 100 and 100' adjacent the cover 96. When the temperature sensor B is not in use, a tubular sensor guard 106 that has an internal threaded left hand end portion 108 as viewed in FIG. 2 is removably secured to the coupling by engaging the threaded portion 86 thereof. The guard 106 protects the cup 82 and resistance element B-1 mounted on the winding element 60.

The cup 82 has a high degree of heat conductivity due to being formed from nickel, and the heat to which the cup is subjected is quickly transferred therethrough to the resistance element wire B-1, and to the winding element 60. The winding element 60 due to being formed from aluminum that has a high degree of heat conductivity is maintained at a uniform temperature therethrough, and as a result all portions of the platimum wire forming the resistance element B-1 is subject to substantially the same temperature. As a result of this construction, the temperature sensor B accurately reflects the temperature to which it is subjected and any variations thereof. From experience, it has been found that a change in the temperature to which the sensor B is subjected is detected in as short a period of time as one-half second, due to the high conductivity of the nickel and aluminum defining the components through which heat must pass to the resistance wire element B-1.

I claim:

1. A temperature sensing assembly that includes:
   a. electrical resistance temperature sensing means that varies linearly in resistance in relation to the temperature to which said sensing means is exposed;
   b. metering means that is responsive to variations in voltage;
   c. a reference operational amplifier and a measuring operational amplifier;
   d. a reference feedback loop and a measuring feedback loop connected to the output and the input of said reference amplifier and said measuring amplifier, said measuring loop including said sensing means;
   e. electric circuit means connected to a source of power and to said reference and measuring amplifiers;
   f. first means in said circuit for supplying constant current to the inputs of said references and measuring amplifiers;
   g. second means in said circuit that connect said metering means to said reference and measuring feedback loops; and
   h. third variable resistance means in said circuit for maintaining said metering means at a zero position when said reference and measuring loops are at the same temperature, but upon said sensing means being exposed to a temperature different from that of said reference loop the resistance of said measuring loop changing and varying the output of said measuring amplifier and the magnitude of the voltage in said measuring loop, and said metering means indicating the voltage differential between said reference and measuring loops that is linearly related to the temperature to which said sensing means is exposed.

2. A temperature sensing assembly as defined in claim 1 in which said metering means is a voltmeter.

3. A temperature sensing assembly as defined in claim 2 in which said voltmeter is calibrated to read temperatures directly.

4. A temperature sensing assembly as defined in claim 1 in which said first means includes a transistor, a plurality of resistors and a plurality of Zener diodes.

5. A temperature sensing assembly as defined in claim 1 in which said third means is a potentiometer and at least one resistor shunt connected to the outputs of said reference and measuring amplifiers.

* * * * *